United States Patent

Guerlin et al.

[11] Patent Number: 5,870,680
[45] Date of Patent: Feb. 9, 1999

[54] METHOD AND AN APPARATUS FOR PLACING DEVICES ON STANDBY IN A SYSTEM INCLUDING A PORTABLE MOBILE TELEPHONE CONNECTED TO A PERIPHERAL DEVICE

[75] Inventors: Jean-Pierre Guerlin, Le Plessis Bouchard; Xavier Sarremejean, Vaureal; Alain Chateau; Pascal Bourrier, both of Paris; Marc de Savigny, Courbevoie, all of France

[73] Assignee: Alcatel N.V., Rijswijk, Netherlands

[21] Appl. No.: 532,500

[22] Filed: Sep. 22, 1995

[30] Foreign Application Priority Data

Sep. 23, 1994 [FR] France .................... 94 11399

[51] Int. Cl.$^6$ .................................................. H04B 1/40
[52] U.S. Cl. ..................... 455/557; 455/574; 455/343
[58] Field of Search ................ 455/89, 38.3, 343, 455/127, 33.1, 557, 559, 574, 575; 370/311; 379/58, 59

[56] References Cited

U.S. PATENT DOCUMENTS

| 5,062,132 | 10/1991 | Yasuda et al. | 455/557 |
| 5,199,000 | 3/1993 | Takahashi | 365/189.09 |
| 5,430,663 | 7/1995 | Judd et al. | 364/550 |
| 5,444,869 | 8/1995 | Stricklin et al. | 455/343 |
| 5,483,574 | 1/1996 | Yuyama | 455/373 |
| 5,519,506 | 5/1996 | D'Avello et al. | 455/373 |
| 5,608,545 | 3/1997 | Kagawn | 455/557 |

FOREIGN PATENT DOCUMENTS

| 0582391A1 | 2/1994 | European Pat. Off. . |
| WO9417502 | 8/1994 | WIPO . |

Primary Examiner—Edward F. Urban
Attorney, Agent, or Firm—Sughrue, Mion, Zinn Macpeak & Seas, PLLC

[57] ABSTRACT

A method and apparatus for conserving energy in a system including first and second devices interconnected by a data communication link via respective first and second interfaces in the first and second devices by sending a message over the link to put the interface in one device on standby. This message is sent by the interface in the other device. The first or second interface is reactivated by the other interface by electrical means via a physical medium of the link.

8 Claims, 3 Drawing Sheets

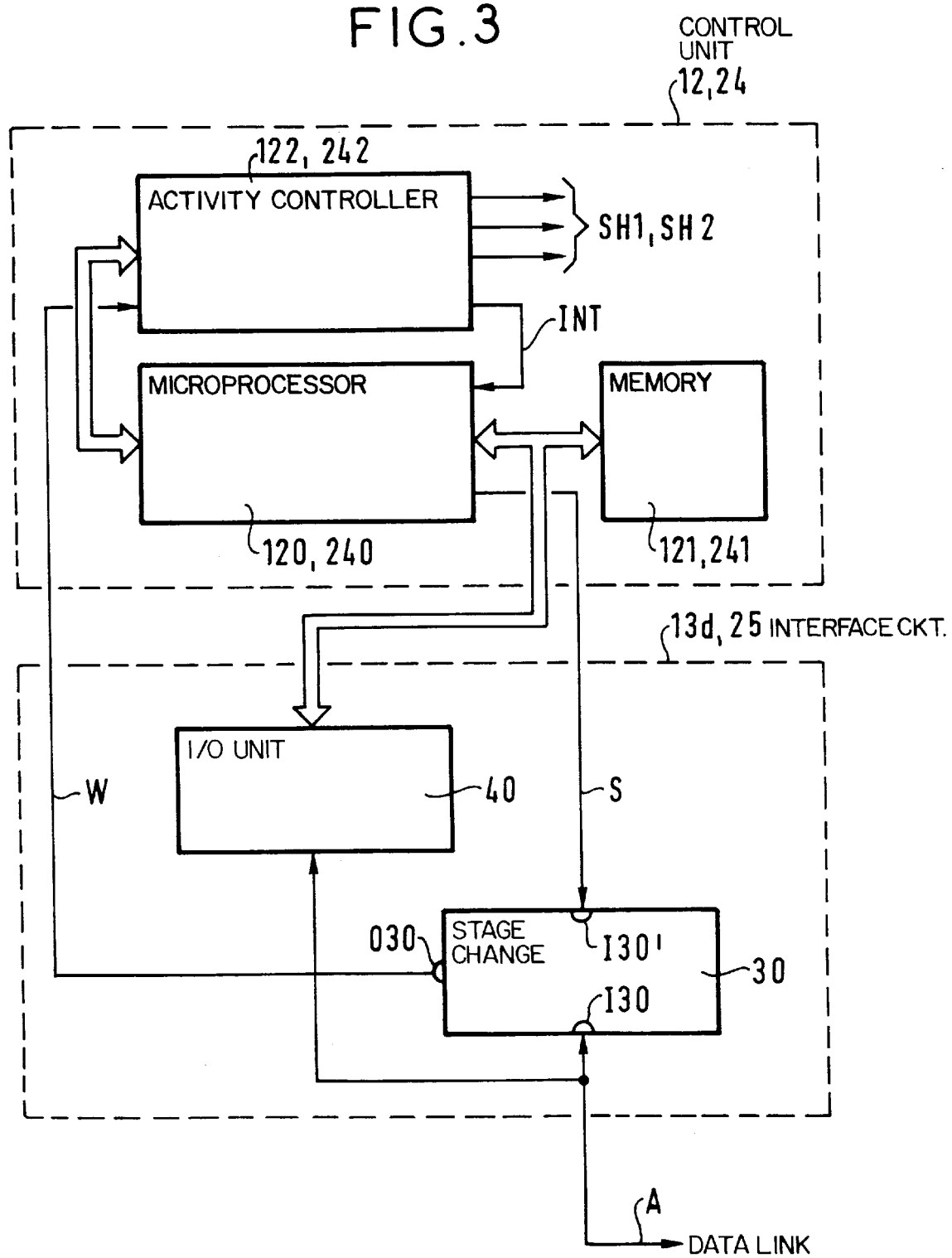

METHOD AND AN APPARATUS FOR PLACING DEVICES ON STANDBY IN A SYSTEM INCLUDING A PORTABLE MOBILE TELEPHONE CONNECTED TO A PERIPHERAL DEVICE

BACKGROUND OF THE INVENTION

1. Field of the Invention

The present invention concerns an energy conservation method for use in a system including two devices interconnected by a data communication link. The two devices have a power supply of limited autonomy and comprise, for example, a portable mobile telephone and a portable microcomputer. The invention also concerns a portable mobile telephone of this kind.

2. Description of the Prior Art

Portable data processing and telecommunication electronic devices call for considerable effort in terms of energy conservation. These devices use batteries of limited capacity and all possible energy conservation techniques must be adopted to increase their battery life. These techniques include switching off the whole or part of a device during periods in which the device is wholly or partially inactive. In the case of a portable mobile telephone, for example, this entails selective deactivation of power supply circuits for the transceiver and external units (display screen, etc) and clock circuits timing digital circuits such as the input/output interface, the central processor unit (typically a microprocessor) and the baseband processing circuit. Although some clock and power supply circuits are deactivated, timers are activated in order to reactivate these clock and power supply circuits after a predetermined time-delay, in order to reactivate the digital circuits that they time or the analog circuits that they supply with power. In the case of a portable mobile telephone that is wholly on standby, for example, timers are activated which at predetermined intervals reactivate circuits that have to listen out for call request messages on the radio link.

Considered in isolation, each of these data processing or telecommunication electronic devices (mobile telephone, microcomputer, etc) has remarkable battery life characteristics as the result of optimum control of deactivation of the device as soon as there is no longer any benefit in it remaining active, i.e. putting the device on standby. However, is clear that the energy conservation function in each of the two devices is not fully optimized when a data communication link is set up between a portable mobile telephone and a portable microcomputer, for example. As used here, the expression "data communication link" is to be understood as having a wider meaning than a mere physical link conveying data, encompassing the concept of communicating software layers in the interconnected devices.

FIG. 1 shows a portable mobile telephone 1 and a portable microcomputer 2 connected by a data communication link provided by a physical medium A. The mobile telephone 1 typically includes a radio transceiver 11 comprising a modulator circuit, a baseband processor circuit and a frequency synthesizer, a control unit 12, and input-output interface circuits 13a, 13b, 13c and 13d each associated with a respective external unit such as a display 14, a buzzer 15 and a keyboard 16. The above circuits are supplied with power by a battery 17. The transceiver 11 sends and receives radio signals via an antenna 1a. The transceiver 11 is connected to a microphone 11a and an earpiece 11b. The control unit 12 controls the transceiver 11 via a bus. The control unit 12 is also connected to each of the input-output interface circuits 13a through 13d.

The portable microcomputer 2 includes a screen 20 and a keyboard 21 connected to a control unit 24 by respective interface circuits 22 and 23 and an interface circuit 25 also connected to the control unit 24. The microcomputer 2 further includes a battery 26 supplying power to each of its circuits.

FIG. 2 shows in more detail the control units 12 and 24 of the portable mobile telephone 1 and the portable microcomputer 2, respectively. Each of the control units 12, 24 includes a microprocessor or microcontroller 120, 240, an associated memory 121, 241, and an activity controller 122, 242. The microcprocessor 120, 240 is connected to the activity controller 122, 242 by an activity control bus Bca, Bca' and to the associated memory 121, 241 by a bus B1, B2. The bus B1, B2 also connects the microprocessor 120, 240 to the interface circuits 13a–13d, 25. The data communication link between the mobile telephone 1 and the microcomputer 2 is implemented by the following circuits: the microprocessor 120, the interface circuit 13d, the physical medium A, the interface circuit 25 and the microprocessor 240. Two ends of the physical medium A are coupled to respective first inputs/outputs of the interface circuits 13d and 25 and the interface circuits 13d and 25 have respective second inputs/outputs connected to the microprocessor 120 by the bus B1 and to the microprocessor 240 by the bus B2.

There follows a description of one example of a prior art mode of operation of the portable mobile telephone 1 and the portable microcomputer 2 interconnected by the data communication link provided by the physical medium A. Initially, when the mobile telephone 1 is switched on, all its circuits are supplied with power and activated for a duration at least equal to the time needed to log the mobile telephone in the cell in which it is currently located. Then, for maximum energy conservation in the mobile telephone 1, the microprocessor 120 cuts off the supply of electrical power to some analog circuits, such as the radio circuits in the transceiver 11, and deactivates the clocks timing some digital circuits, such as the baseband processor circuit or the control unit 12. To this end, the control unit 12 includes the activity controller 122 controlled by the microprocessor 120. The microprocessor 120 sends a message on the activity control bus Bca to an input of the controller 122. On receiving this message, and according to its contents, the controller places the mobile telephone 1 wholly or partly on standby. In particular, it deactivates some or all of the clock circuits producing clock signals SH1 timing the digital circuits and starts timers that reactivate the clock circuits that have been deactivated, after a predetermined time-delay. When the mobile telephone 1 is wholly on standby, only the circuit 122 remains active. In this case, in one prior art system, at a predetermined time of reception of a call request radio message that corresponds to the expiry of a time-delay, the circuit 122 produces a signal that activates clock and power supply circuits which supply power to the radio circuits and time the digital circuits in the transceiver 11 and the control unit 12, in order to enable reception of a call request radio message. If any such call request message concerns the mobile telephone 1, other circuits are activated by the microprocessor via the activity controller, such as the screen 14 and the buzzer 15. All the circuits activated in this way are put back on standby by the microprocessor 120 via the controller 122 as soon as possible, i.e. at the end of the call if the call request message is addressed to the mobile telephone 1 or immediately after the call request message is received if it is not addressed to the mobile telephone.

The control circuit in the microcomputer 2 can also apply energy conservation management techniques in respect of its circuits by deactivating the power supply to the screen, the microprocessor 240, etc by means of the circuits 240 through 243. It uses the activity controller 242 which selectively deactivates clock circuits producing clock signals SH2 timing the digital circuits.

If a data communication link between the mobile telephone 1 and the microcomputer 2 is established via the interface circuits 13d and 25 in the mobile telephone 1 and the microcomputer 2, respectively, in the prior art some circuits may no longer make any contribution to energy conservation in the system comprising the mobile telephone 1 and the microcomputer 2. Typically, the wired connection between the microcomputer 2 and the mobile telephone 1 via the medium A precedes a data communication link set-up phase. To set up the link between them, messages are exchanged between the microcomputer 2 and the mobile telephone 1. The data link set up then allows the mobile telephone 1 to transmit data to the microcomputer 2 and the microcomputer 2 to transmit data to the mobile telephone 1. The data is transmitted to or received from the mobile telephone network via the mobile telephone 1, for example. The data link set up between the mobile telephone 1 and the microcomputer 2 complies with the Open Systems Interconnect (OSI) recommendations of the ISO, for example. The respective microprocessors 120 and 240 in the control units 12 and 24 therefore manage a common protocol for the data link between the mobile telephone 1 and the microcomputer 2. In the prior art protocols of this kind provide data link set-up and, maintain and clear-down phases, without solving the problem of energy expenditure resulting from the existence of the link. As shown by the shaded parts of FIG. 2, the circuits required for the link to exist, including the two microprocessors 120 and 240 and the interfaces 13d and 25 in the mobile telephone 1 and the microcomputer 2, respectively, are not put on standby or deactivated. This is because a data link enables only exchange of digital data, typically in the form of messages (frames, packets, etc), between the microcomputer 2 and the mobile telephone 1. This digital data does not allow remote activation of the interface circuits 13d, 25 and the microprocessors 120, 240 of one device by another, specifically in the case where the circuits 13d, 25 and 120, 240 of the remote device are on standby. The PHYSICAL layer of the data link is transparent to the data transmitted. It therefore cannot activate circuits involved in a data link on the basis of information received. In an application involving a mobile telephone connected to a microcomputer, each of these devices must be able to reactivate remotely circuits of the other device that are involved in the data link, failing which these circuits cannot be put on standby. For example, the mobile telephone must be able to reactivate the microcomputer in order to retransmit to it data that the mobile telephone has received.

SUMMARY OF THE INVENTION

The invention is intended to remedy the above drawback by making provision for placing the microprocessors and the input-output interface circuits in the mobile telephone and the microcomputer on standby.

More generally, a primary object of the invention is to provide an energy conservation method for use in a system including two devices interconnected by a data communication link.

To this end, the invention provides an energy conservation method for use in a system including first and second devices interconnected by a data communication link via respective first and second interface means in the first and second devices, the method comprising the following steps:

sending a message over the link to put the interface means in one of the devices on standby, the message being sent by the interface means in the other device, and reactivating the first or second interface means by the other interface means by electrical means via a physical medium constituting the link.

The above standby and reactivation steps are not necessarily indissociable, in the sense that the reactivation step can follow on from a standby step or a step in which the other device, such as a mobile telephone, is powered down.

In a first embodiment, the standby step consists in the interface means in the other device sending a "go to standby" message to the interface means in said one device via said physical medium.

In a second embodiment, the standby step is the consequence of failure by the interface means in one of the devices to receive in a predetermined time any scanning message sent by the interface means in the other device, the interface means in the other device ceasing to send scanning messages as the result of the interface means in said one device failing to send a message requesting to send data in response to N scanning messages.

In accordance with one important feature of the invention, the reactivation step consists in either the first or the second interface means changing the state of a signal on said physical medium.

Typically, the physical medium conveys, non-simultaneously, data messages sent via the data communication link and the signal in which a state change enables reactivation of one of the first and second interface means by the other interface means. The first and second interface means each comprise an interface circuit and a microprocessor, and putting the interface means in one of the devices on standby results in deactivation of clock circuit means timing the microprocessor and the interface circuit.

The invention further provides input/output means, means for generating a state change in the signal on the physical medium for a predetermined time in response to a reactivation command signal and means for detecting a state change in a signal on the physical medium in order to respond thereto by activating control means producing a signal to activate a clock signal timing the microprocessor and the interface circuit and an interrupt signal fed to the microprocessor.

The invention also provides a mobile telephone including radio transceiver means, control means, an interface circuit comprising input/output means, and means for putting a peripheral device on standby by sending a message and wherein the input/output means further comprise means for generating a state change in a signal on the physical medium for a predetermined time in response to a reactivation command signal and means for detecting a state change in a signal on the physical medium in order to respond thereto by activating control means producing a signal to activate a clock signal timing the microprocessor and the interface circuit and an interrupt signal fed to the microprocessor.

Other features and advantages of the present invention will emerge more clearly from a reading of the following description with reference to the appended drawings.

BRIEF DESCRIPTION OF THE DRAWINGS

FIG. 3 shows a block schematic of an interface circuit of the invention for implementing the energy conservation method of the invention.

DETAILED DESCRIPTION OF THE PREFERRED EMBODIMENT

Figure 1:
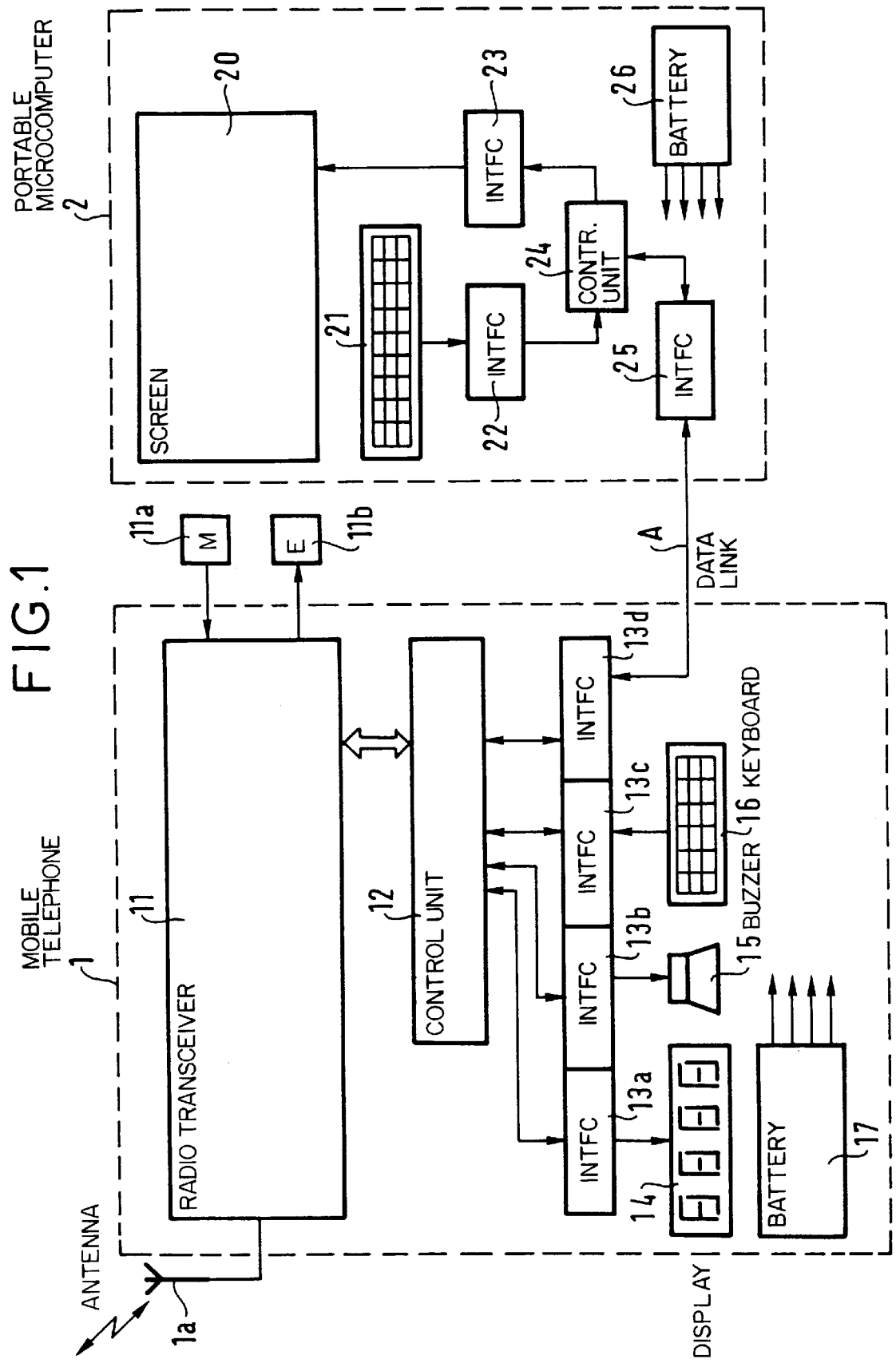
FIG. 1 shows in the form of a block schematic a communication system including a portable telephone and a microcomputer interconnected by a data communication link.

The Open Systems Interconnect (OSI) recommendation of the ISO defines a model made up of software and hardware layers each having a particular function in an interconnection between two systems. These layers include the PHYSICAL, LINK, NETWORK, SESSION, PRESENTATION and APPLICATION layers. The SESSION layer, for example, defines the methods of setting up a connection, the LINK layer guarantees the integrity of the transmitted data and the PHYSICAL layer is concerned with functions such as synchronizing the exchange of data and electrical methods of transmission. Each layer uses the services of lower layers to communicate with its counterpart layer in the remote device.

The principles of energy conservation are not applied to the interface circuits 13d and 25 and the microprocessors 120 and 240 in two devices interconnected by a data communication link, in the OSI sense, in any prior art implementation and application of these principles necessitates a redefinition, at least in part, of the implementation of the protocols for interconnection of two devices. Thus there is no provision in the prior art for placing on standby the PHYSICAL layers of a link of this kind, these forming a large part of the interface circuits 13d and 25, or the higher layers implemented by the microprocessors 120, 240 and the associated memories 121, 241. In practise, placing these circuits on standby entails deactivating the clocks which activate the interface circuits and microprocessors. Suppose that after a period on standby there is data to be transmitted by the microcomputer 2 to the mobile network via the portable telephone 1. The microprocessor 240 and the interface 25 in the microcomputer 2 are reactivated, for example in response to user action, but there is nothing in the prior art to enable the microcomputer to reactivate remotely the interface circuit 13d and the microprocessor 120 in the mobile telephone 1, as these are no longer receiving any clock signal. Considered in isolation, the data link allows only exchange of digital data or messages (frames, packets, etc) between the microcomputer 2 and the mobile telephone 1. Digital data does not allow remote activation of the interface circuit 13d and microprocessor 120 of the mobile telephone 1. Once the interface circuit 13d and the microprocessor 120 are on standby, they cannot be reactivated remotely by means of a message, precisely because the interface circuit 13d and the microprocessor 120 in the mobile telephone 1 are on standby.

Figure 2:
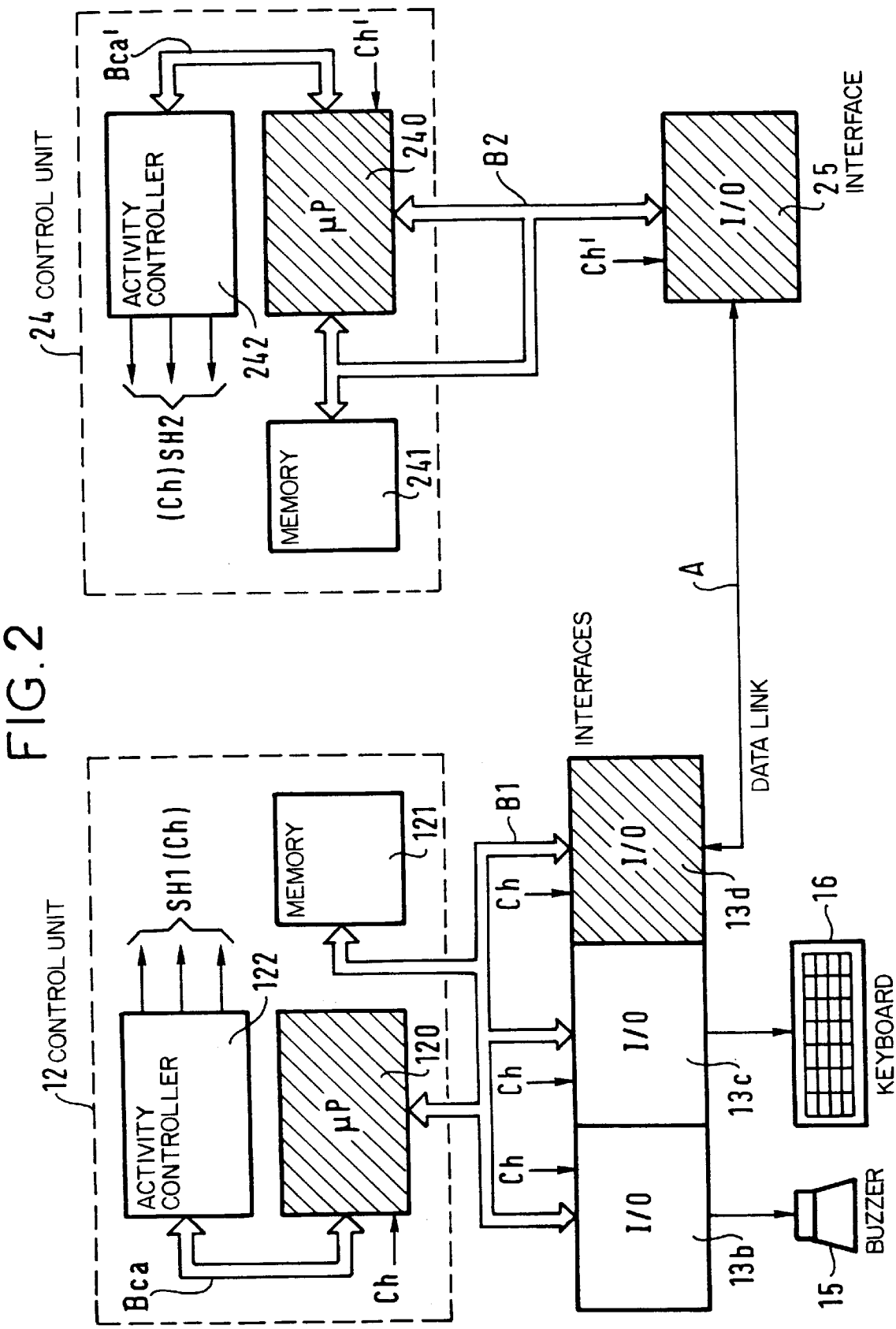
FIG. 2 shows in the form of a more detailed block schematic two control circuits and associated interface circuits included in the portable telephone and the microcomputer from FIG. 1.

Two specific embodiments of the invention are now described with reference to FIGS. 2 and 3. Both these embodiments entail master-slave type operation of the mobile telephone 1 and the microcomputer 2, the mobile telephone 1 being the master device and the microcomputer 2 being the slave device. Only the mobile telephone 1 can decide to place the link between it and the microcomputer 2 on standby. All the circuits needed to interconnect the mobile telephone 1 and the microcomputer 2, including the microprocessor 120 and the interface circuit 13d in the mobile telephone 1 and the microprocessor 240 and the interface circuit 25 in the microcomputer 2, must be associated with each other, in interface terms.

The mobile telephone 1 periodically transmits scanning messages to the microcomputer 2 via the interface circuit 13d and the physical medium A. These messages invite the microcomputer 2 to send back a message requesting to send data, if necessary.

In the first embodiment, if when N scanning messages (N=3, for example) have been sent with no message requesting to send data having been sent back by the microcomputer 2, the mobile telephone 1 decides to place the microcomputer 2 on standby. It does this by sending a "go to standby" message to the microcomputer 2 over the data link set up with the microcomputer. This message is received by the microprocessor 240 in the microcomputer 2 which responds by commanding the activity controller 242 via the bus Bca' to deactivate the clock circuits timing the microprocessor 240 and the interface circuit 25.

In the second embodiment, if when an integer number N (N=3, for example) of scanning messages have been sent with no message requesting to send data has been sent back by the microcomputer 2, the mobile telephone 1 decides to place the microcomputer 2 on standby. It does this by ceasing to send scanning messages on the data link set up with the microcomputer 2. When it has not received any scanning messages in a predetermined time interval, the microprocessor 240 in the microcomputer 2 commands the activity controller 242 via the bus Bca' to deactivate the clock circuits timing the microprocessor 240 and the interface circuit 25.

Both embodiments described above entail the mobile telephone placing the microcomputer 2 on standby by means of messages, either by sending a "go to standby" message or by ceasing to send scanning messages. In both embodiments, and assuming that there is no other peripheral device such as a facsimile machine also connected to the mobile telephone 1 and sending a message to request to send data in response to a scanning message, the mobile telephone 1 places its own interface circuits on standby, namely the microprocessor 120 and the interface circuit 13d, via the activity controller 122. As a result of the process described so far, the circuits 120, 240, 13d and 25 are on standby and energy conservation is maximal. Nevertheless, neither the microcomputer 2 nor the mobile telephone 1 has been powered down, and both can reactivate without delay the data link that has been temporarily "put on standby" by deactivation of the clocks timing the circuits 120, 240, 13d and 25. The two typical cases in which such reactivation occurs are directly related to reception by the mobile telephone 1 of data addressed to the microcomputer 2 or sending by the microcomputer 2 of data addressed to the mobile telephone 1. Activation of the mobile telephone 1 or the microcomputer 2 by the other device is effected in the following manner: initially the microprocessor in one of the devices 1 or 2 (the mobile telephone 1, for example, in the remainder of the description) is activated in response to an external event, such as the user pressing a key, or by the signal produced by the clock circuit reactivated by the activity controller. In the latter case, for example, the microprocessor 120 activates the circuits needed to receive a call request signal, via the activity controller 122. Assuming that a call request concerns a call to transfer data to the microcomputer 2, the microprocessor 120 commands activation of the interface circuit 13d. The mobile telephone then reactivates the microprocessor 240 and the interface circuit 25 in the microcomputer 2. In accordance with an important feature of the invention, given that the circuits 25 and 240 in the microcomputer 2 are on standby, these circuits are reactivated by the mobile telephone 1 by electrical means, for example by a state change for a time exceeding a predetermined time in a signal present on the physical medium A of the link and fed to the input of the interface circuit 25 in the microcomputer 2. This feature differs radically from prior art implementations in which the data link conveys only digital electrical data (messages), and in which the interface circuits 13d and 25 are transparent to the nature of the data.

As shown in FIG. 3, identical interface circuits 13d, 25 in the mobile telephone 1 and the microcomputer 2, respectively, for implementing the invention comprise an input/output unit 40 and a circuit 30 for detecting and generating state changes in a signal on the physical medium A. A first input I30 of the circuit 30 is connected to one end of the physical medium A of the link. A second input I30' receives a state change generation signal S produced by the microprocessor 120, 240. An output O30 of the circuit 30 is connected to an input of the activity controller 122, 242 and produces a reactivation command signal W. The unit 40 is connected to the microprocessor 120, 240 via the bus B1, B2. When the interface means 120, 13d or 240, 25 in one of the devices 1 or 2 has to reactivate the interface means in the other device, the microprocessor 120, 240 produces the state change generation signal S that is fed to the input of the circuit 30. In response, the circuit 30 changes the state of the signal on the physical medium A for a predetermined time. The interface means 120, 13d or 240, 25 in the other device, which is on standby, operate as follows: in response to detection by the circuit 30 in the other device (the microcomputer 2 or the mobile telephone 1) of a state change in the signal on the medium A for a time greater than the predetermined time, the circuit 30 produces the reactivation command signal W addressed to the activity controller 122, 242. On receiving the reactivation command signal W, the activity controller 122, 242 reactivates the clock circuit timing the microprocessor 120, 240 and sends an interrupt signal to the microprocessor 120, 240. Note that putting the interface circuits 13d, 25 on standby affects only the unit 40 and not the circuit 30, which remains active in order to detect any state change in the signal on the medium A. The interrupt signal INT enables the microprocessor to "branch" to a program managing the interface with the mobile telephone 1 or the microcomputer 2 enabling communication with the latter.

As previously mentioned, it can be the microcomputer 2 that initiates activation of the interface and the interface circuit 13d in the mobile telephone is identical to that 25 in the microcomputer (FIG. 3).

There is advantageously a single physical medium A for conveying, non-simultaneously, data messages transmitted via the data communication link and the state change generation signal enabling reactivation of the microcomputer or the mobile telephone by the other device. This means that a single wire link (ignoring the ground connection) conveys both types of data.

It will be obvious to the person skilled in the art that reactivation and putting on standby in the microcomputer 2 and the mobile telephone 1 have to be managed allowing for the current status of the circuits 120, 13d and 240, 25 in the mobile telephone and the microcomputer. In the example described above, for example, a layer higher than the PHYSICAL layer has to know that the mobile telephone 1, for example, is on "standby" and generate a primitive accordingly so that the PHYSICAL layer in the mobile telephone 1 produces the state change of the signal on the physical medium and thereby activates the remote microcomputer.

The scope of the present invention encompasses any system including two devices interconnected by a data communication link.

There is claimed:

1. An energy conservation method for use in a system including first and second devices interconnected by a data communication link via respective first and second interface means in said first and second devices and a physical medium, each of said first and second interface means comprising a microprocessor and an interface circuit coupled to one end of said physical medium, said method comprising the following steps:

putting said interface means in one of said first and second devices on standby by a message over said link, said step being controlled by the interface means in the other of said devices; and reactivating one of said first and second interface means by the other of said interface means by electrical means via said physical medium.

2. The method according to claim 1, wherein said putting step comprises sending a "go to standby" message to said interface means in said one device via said physical medium by said interface means in said other device.

3. The method according to claim 1, wherein said putting step comprises detecting failure by said interface means in one of said devices to receive in a predetermined time any scanning message sent by said interface means in the other of said devices, said interface means in said other device ceasing to send a multiple n of scanning messages as a result of said interface means in said one device failing to send a message requesting to send data in response to a multiple k of scanning messages.

4. The method according to claim 1, wherein said reactivating step comprises the step of changing the state of a signal on said physical medium by either said first or said second interface means.

5. The method according to claim 4, wherein said changing step comprises non-simultaneously conveying by said physical medium data messages sent via said data communication link and the signal in which a state change enables reactivation of one of said first and second interface means by the other of said interface means.

6. The method according to claim 1, wherein said first and second interface means each comprise an interface circuit and a microprocessor, and said putting step comprises deactivating a clock circuit means timing said microprocessor and said interface circuit.

7. An interface circuit for use in a system including first and second devices interconnected by a physical medium constituting a data communication link via respective first and second interface means in said first and second devices, said interface means comprising said interface circuit and a microprocessor, said interface circuit comprising input/output means, means for generating a state change in a signal on said physical medium for a predetermined time in response to a reactivation command signal, and means for detecting said state change in said signal on said physical medium in order to respond thereto by activating a control means producing a signal to activate a clock signal timing said microprocessor and said interface circuit and an interrupt signal fed to said microprocessor, wherein said clock signal is deactivated when said interface means is on standby, and wherein one of said first and second devices generates said state change in said signal on said physical medium, and the other of said first and second devices detects, and responds to, said state change in said signal on said physical medium.

8. A mobile telephone comprising a radio transceiver means, control means, and an interface means, said interface means comprising an interface circuit and a microprocessor, wherein said interface circuit further comprises input/output means and means for putting a peripheral device on standby by sending a message, wherein said input/output means further comprises means for generating a state change in a signal on a physical medium for a predetermined time in response to a reactivation command signal, and means for detecting said state change in a signal on said physical medium in order to respond thereto by activating said control means producing a signal to activate a clock signal timing said microprocessor and said interface circuit and an interrupt signal fed to said microprocessor, wherein said clock signal is deactivated when said interface means is on standby, and wherein said physical medium includes a communication link between said mobile telephone and said peripheral device.

* * * * *